United States Patent
Santelli, Jr.

(10) Patent No.: US 12,500,399 B2
(45) Date of Patent: Dec. 16, 2025

(54) SYSTEM AND METHOD FOR MOUNTING OF A WIRE MANAGEMENT SYSTEM

(71) Applicant: Albert Santelli, Jr., Martinsville, NJ (US)

(72) Inventor: Albert Santelli, Jr., Martinsville, NJ (US)

( * ) Notice: Subject to any disclaimer, the term of this patent is extended or adjusted under 35 U.S.C. 154(b) by 511 days.

(21) Appl. No.: 17/722,456

(22) Filed: Apr. 18, 2022

(65) Prior Publication Data

US 2022/0337042 A1 Oct. 20, 2022

Related U.S. Application Data

(60) Provisional application No. 63/175,626, filed on Apr. 16, 2021.

(51) Int. Cl.
*H02G 3/04* (2006.01)

(52) U.S. Cl.
CPC ......... *H02G 3/0462* (2013.01); *H02G 3/0437* (2013.01)

(58) Field of Classification Search
None
See application file for complete search history.

(56) References Cited

U.S. PATENT DOCUMENTS

| | | | |
|---|---|---|---|
| 3,033,970 A * | 5/1962 | Eisler | H01B 7/08 174/117 FF |
| 3,491,971 A * | 1/1970 | Fisher | H02G 3/266 24/339 |
| 4,454,374 A | 6/1984 | Pollack | |
| 5,278,356 A * | 1/1994 | Miller | C09J 7/20 174/117 A |
| 5,593,756 A * | 1/1997 | Miller | H02G 3/266 428/343 |
| 6,911,597 B2 * | 6/2005 | Seamans | H02G 3/266 174/95 |
| 8,420,942 B2 * | 4/2013 | Short | H02G 3/0412 174/95 |
| 8,842,960 B2 * | 9/2014 | Berglund | G02B 6/4459 385/136 |
| 9,435,920 B2 * | 9/2016 | Schlueter | F21V 33/004 |
| 9,640,958 B2 * | 5/2017 | Dower | H02G 3/266 |
| 2006/0185883 A1 * | 8/2006 | Santelli, Jr. | H02G 3/00 174/72 A |
| 2008/0121763 A1 * | 5/2008 | Mori | H02G 3/32 248/68.1 |
| 2009/0065249 A1 * | 3/2009 | Silvers | H02G 3/305 174/72 A |

(Continued)

*Primary Examiner* — Krystal Robinson

(74) *Attorney, Agent, or Firm* — Calderone McKay, LLC

(57) ABSTRACT

A system and method for a mounting of a wire management system in which the wire management system includes a cord cover. A first portion providing removable adhesion to a surface and a second portion providing permanent adhesion to a surface. A an adhesive release liner can be attached over the first portion and the second portion. The adhesive release liner covering the first portion can be formed of a different color than the adhesive release liner covering the second portion for easily identifying the type of use in a removable or permanent application. Pulling the adhesive release liner from one or the other of the adhesive materials or adhesive strips of the first or second portions will give a removeable bond or a permanent bond.

18 Claims, 3 Drawing Sheets

(56) References Cited

U.S. PATENT DOCUMENTS

| | | | | |
|---|---|---|---|---|
| 2014/0299347 A1* | 10/2014 | Stapleton | ............. | G06F 16/335 |
| | | | | 174/68.3 |
| 2016/0108662 A1* | 4/2016 | Schlueter | ............. | E06B 7/2312 |
| | | | | 49/498.1 |
| 2020/0295547 A1* | 9/2020 | Santelli, Jr. | ............ | B65D 63/10 |
| 2020/0343701 A1* | 10/2020 | Santelli, Jr. | ......... | H02G 3/0418 |

* cited by examiner

SYSTEM AND METHOD FOR MOUNTING OF A WIRE MANAGEMENT SYSTEM

BACKGROUND OF THE INVENTION

Field of the Invention

The present invention in general to an electric wire holder for hiding wire and in particular to a system and method for mounting of a wire management system including both removable and permanent applications.

Description of Related Art

It is known that electrical the cords of domestic appliances such as clocks and lamps are unsightly and generally hang or run loosely from the appliances to the electrical outlets in a room. U.S. Pat. No. 4,454,374 describes an electric cord holder, which includes a sheath made of an elongated plastic extrusion having a slotted-tubular cross-section so as to define a cord-receiving channel therein. The sheath has a dome-shaped front wall having two ends and a planar rear wall joined to one end of the front wall and extending from the one end of the front wall towards the other end of the front wall. The rear wall has a free end leaving a slot adapted for insertion of an electrical cord into the cord-receiving channel between the free end of the rear wall and the other end of the front wall. The rear wall has an inner face which partially defines the cord-receiving channel and an outer face. The front wall has an overhang depending from the other end thereof which extends beyond the outer face and at least slightly toward the free end of the rear wall. The holder further includes securing means a connected to the outer face of the rear wall and adapted to be attached to an external surface, whereby the electric cord holder may be attached to the external surface with the overhang substantially abutting the external surface.

US Patent Application Publication 20200343701 describes a wire management system including a cord cover. The cord cover can be formed of a rigid material, such as for example rigid plastic. In one embodiment, the cord cover incudes a front wall coupled or integral with two side walls. The width of the rear wall can be less than the width of the front wall to form an opening between the rear wall and the opposed side wall. A cavity is formed between the front wall, side walls and rear wall. In one embodiment a flexible entry tab is formed at an end of one of the side walls for entry into the cavity. The cord or cords to be covered can be received within the cavity of the cord cover. The cord cover includes an adhesive strip which provides permanent adhesion on a side attached to the cord cover. An opposite side of the adhesive strip provides removable adhesion to a surface to which the cover is adhered for allowing the cord cover to be re-positioned or re-used without damaging the surface.

It is desirable to provide an improved system and method for mounting of a wire management system in which the wire management system can be expeditiously attached in either a removable or permanent application.

SUMMARY OF THE INVENTION

The present invention relates to a system and method for a mounting of a wire management system in which the wire management system includes a cord cover. The mounting system of the present invention includes a first portion providing removable adhesion to a surface and a second portion providing permanent adhesion to a surface. The first portion allowing the cord cover to be re-positioned or re-used without damaging the surface.

The first portion of the mounting system can include an adhesive material or adhesive strip having permanent adhesion on a side attached to the cord cover. A mounting side of the adhesive or adhesive strip opposite of the side attached to the cord cover providing removable adhesion to a surface. A first adhesive release liner is placed over the mounting side of the adhesive material or adhesive strip of the first portion. A material of the first adhesive release liner can be formed of a first color. For example, the first adhesive release liner can be formed of a red material.

The second portion of the mounting system can include an adhesive material or adhesive strip having permanent adhesion on a side attached to the cord cover. A mounting side of the adhesive or adhesive strip opposite of the side attached to the cord cover providing permanent adhesion to a surface. A second adhesive release liner is placed over the mounting side of the adhesive material or adhesive strip of the second portion. A material of the second adhesive release liner can be formed of a second color. The second color can be different than the first color. For example, the second adhesive release liner can be formed of a blue material.

During use, the first adhesive release liner can be pulled to release the first adhesive release liner from the adhesive material or adhesive strip of the first portion to expose the adhesive material or adhesive strip of the first portion. The adhesive material or adhesive strip of the first portion is removably adhered to a surface. In this use, the second release liner remains covering the second portion. Alternatively, the second release liner can be pulled to release the second adhesive release liner from the adhesive material or adhesive strip of the second portion to expose the adhesive material or adhesive strip of the second portion or both the first adhesive release liner and the second adhesive release liner are pulled expose the adhesive material or adhesive strip of the first portion and the second portion. The adhesive material or adhesive strip of the second portion is permanently adhered to a surface. Accordingly, by pulling the adhesive release liner from one or the other of the adhesive materials or adhesive strips of the first or second portions will give a removeable bond or a permanent bond.

In one embodiment, during use cord or cords to be covered can be received within the cord cover. The first adhesive release liner or the second adhesive release liner is removed and the adhesive material or adhesive strip of the respective first portion or second portion is applied to a surface over which a cord or cable is desired to extend. The surface can be a wall. In one method, a portion of the first adhesive release liner and/or the second adhesive release liner can be peeled back on each end of the cord cover and the cord cover can be placed in position to check alignment. Once the correct position is determined the remainder of the first adhesive release liner and/or the second release liner can be removed. In an alternate embodiment, the first adhesive release liner and/or the second adhesive release liner is removed and the respective adhesive material or adhesive strip of the first portion or the second portion is applied to a surface over which a cord or cable is desired to extend. The flexible entry tab can be flexed to allow the cord or cable to be inserted through the opening between the rear wall into the cavity of the cord cover. The cord or cable can be removed from the cavity upon flexing the flexible entry tab and removing the cord or cable from the cavity. This embodiment allows cords or cables to be expeditiously replaced after attachment of the wire management system to the surface.

The mounting system of the present invention provides permanent and removable mounting for multi-purpose applications, thereby allowing the user more versatility. The removable adhesive comes off the mounting surface clean leaving no residue or marking on most household surfaces, including furniture. The mounting system can be used in a do it yourself consumer application for homes, offices, college dorm rooms, apartments to provide child and pet safety and general wire or cable concealment.

The invention will be more fully described by reference to the following drawings.

Figure 1:
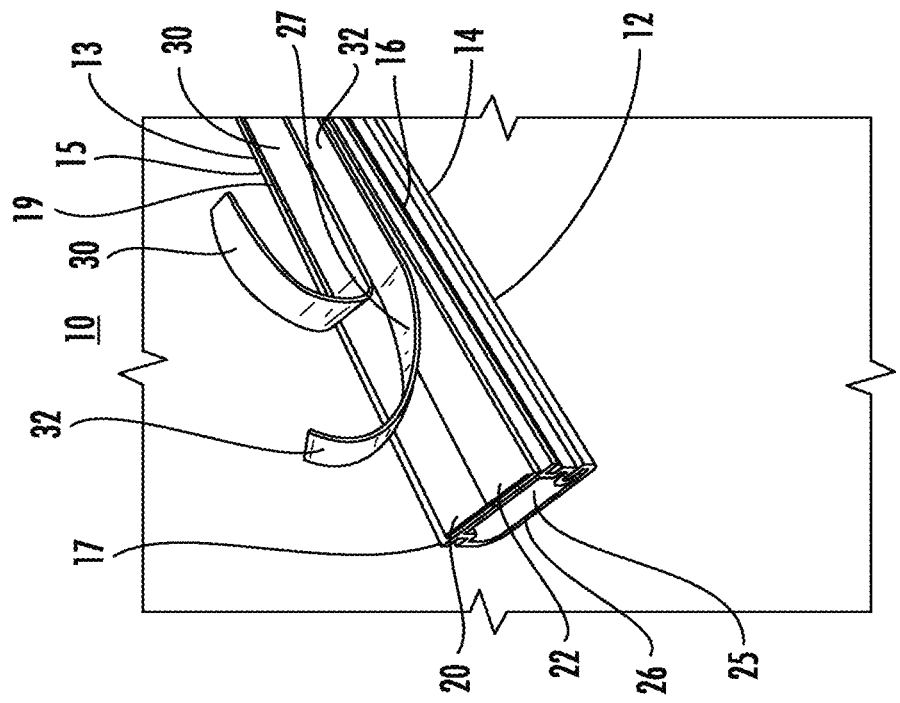
FIG. 1 is a perspective view of a system for mounting a wire management system during use in a removable application.

Embodiments of the present disclosure and their advantages are best understood by referring to the detailed description that follows. It should be appreciated that the figures may not be necessarily drawn to scale.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
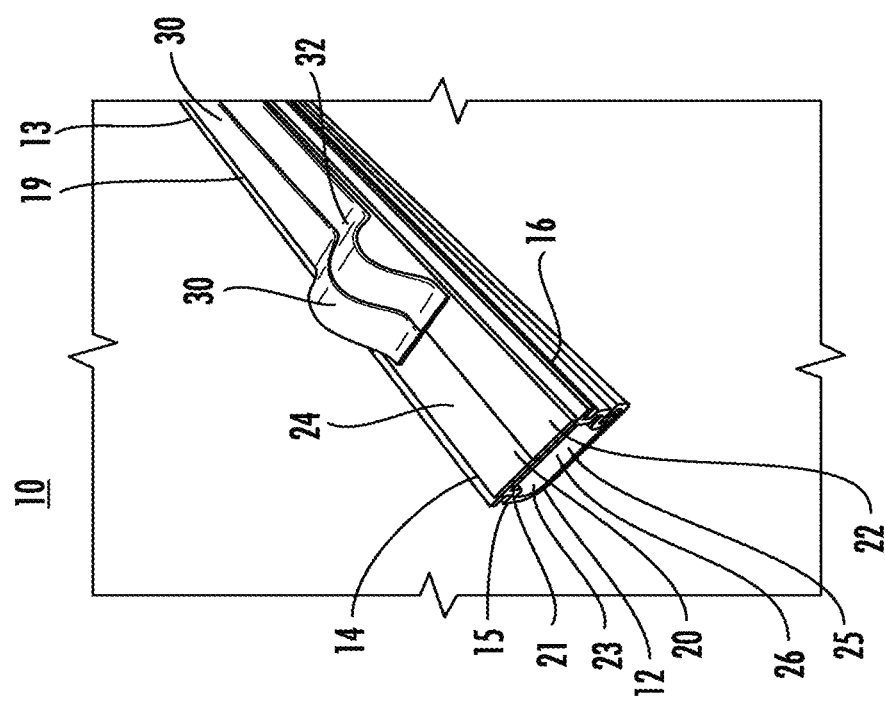
FIG. 2 is a perspective view of a system for mounting a wire management system during use in a permanent application.
Figure 3:
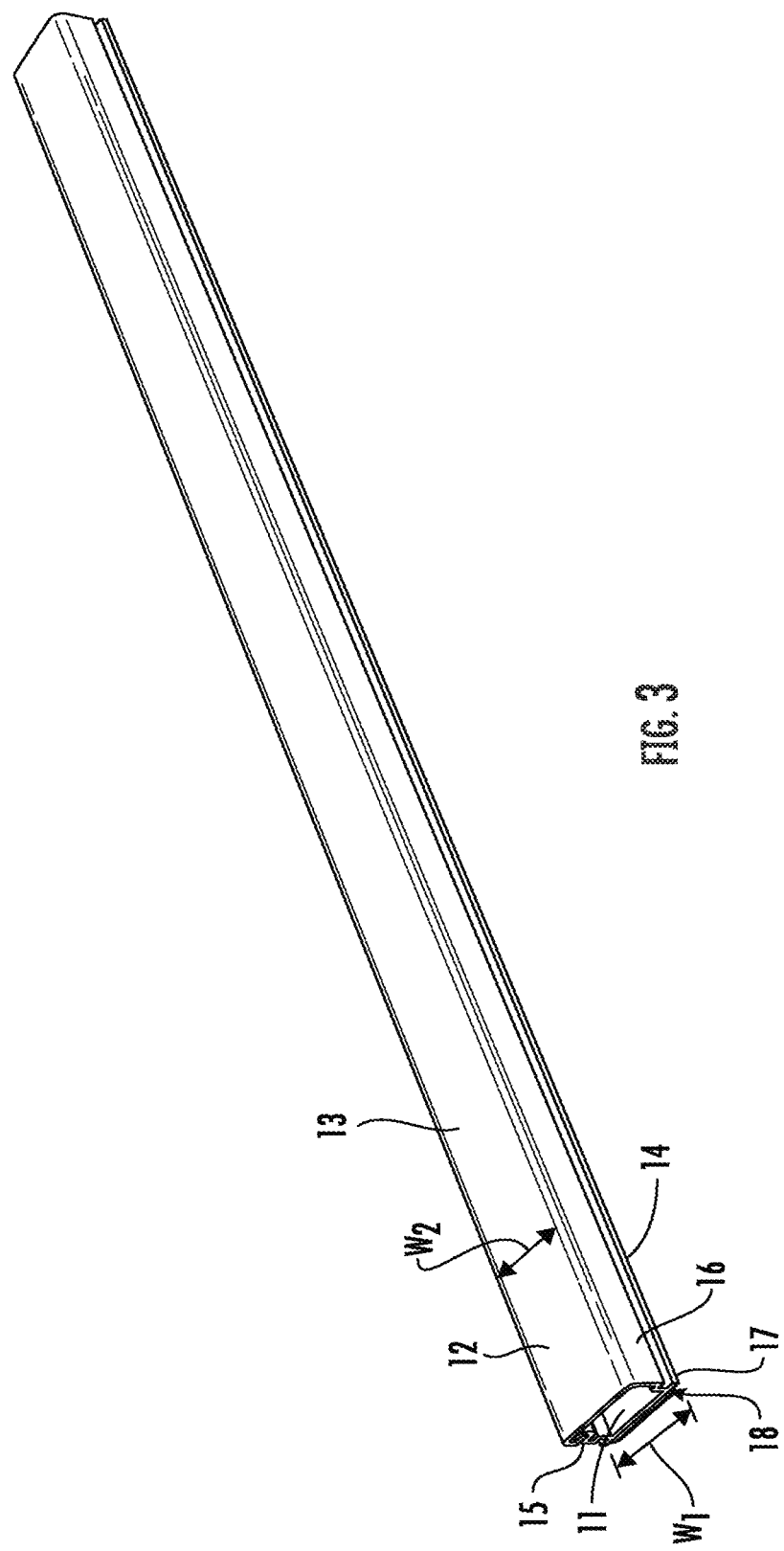
FIG. 3 is a perspective view of a cord cover used in the mounting a wire management system.

FIGS. 1 and 2 are perspective views of system for mounting a wire management system 10. System for mounting wire management system 10 includes cord cover 12. In one embodiment, cord cover 12 incudes front wall 13 coupled or integral with side wall 15 and side wall 16 as shown in FIG. 3. End 17 of side wall 16 is coupled or integral to rear wall 14. Width W1 of rear wall 14 can be less than width W2 of front wall 13 to form opening 18 between rear wall 14 and side wall 15. Cavity 11 is formed between front wall 13, side wall 15, side wall 16 and rear wall 14. Front wall 13 and rear wall 14 can be parallel to one another and perpendicular to side wall 15 and side wall 16. For example, W1 can be in the range of about 0.5 to about 2 inches, about 0.75 to about 1.5 inches and about 1.0 to about 1.25 inches. W2 can be in the range of about 0.7 to about 2.5 inches, about 0.75 to about 1.75 inches and about 1.25 to about 1.5 inches.

Referring to FIGS. 1 and 2, first portion 20 provides removable adhesion to a surface to which the cord cover is adhered and second portion 22 provides permanent adhesion to surface to which the cover is adhered. First portion 20 provides removable adhesion to a surface to which cord cover 12 is adhered for allowing cord cover 12 to be re-positioned or re-used without damaging the surface.

First portion 20 can include an adhesive material or adhesive strip attached or coated on outer surface 19 of rear wall 14 of cord cover 12. First portion 20 is permanently attached to rear wall 14. In one embodiment, first portion 20 is a pressure sensitive adhesive strip 21. Side 23 of pressure sensitive adhesive strip 21 includes a permanent adhesive to permanently attach side 23 to outer surface 19 of rear wall 14 of cord cover 12. Side 24 of pressure sensitive adhesive strip 21 includes a removable adhesive. Side 24 can be attached to a surface for removably adhering cord cover 12. An example of an adhesive which provides permanent adhesion is 3M foam tape #4462. An example of an adhesive which provides removable adhesion is Duraco REMO ONE foam tape. In one embodiment, pressure sensitive adhesive strip 21 is 0.250 inches wide and 0.032 inches thick.

First adhesive release liner 30 is placed over first portion 20. In one embodiment, first adhesive release liner 30 is removably attached to side 24 of pressure sensitive adhesive strip 21. First adhesive release liner 30 can be formed of a first color. For example, first adhesive release liner 30 can be formed of a red material.

Second portion 22 can include an adhesive material or adhesive strip attached or coated on outer surface 19 of rear wall 14. Second portion 22 is permanently attached to rear wall 14. In one embodiment, second portion 22 is a permanent adhesive strip 25. Side 26 of permanent adhesive strip 25 includes a permanent adhesive to permanently attach side 26 to outer surface 19 of rear wall 14 of cord cover 12. Side 27 of permanent adhesive strip 25 includes a permanent adhesive. Side 27 can be attached to a surface for permanently adhering cord cover 12. An example of an adhesive which provides permanent adhesion is 3M foam tape #4462. In one embodiment, permanent adhesive strip 25 is 0.250 inches wide and 0.032 inches thick.

Second adhesive release liner 32 is placed over second portion 22. In one embodiment, second adhesive release liner 32 is removably attached to side 27 of permanent adhesive strip 25. Second adhesive release liner 32 can be formed of a second color. The second color of second adhesive release liner 32 can be different from the first color of first adhesive release liner 32. For example, second adhesive release liner 32 can be formed of a red material.

Figure 4:
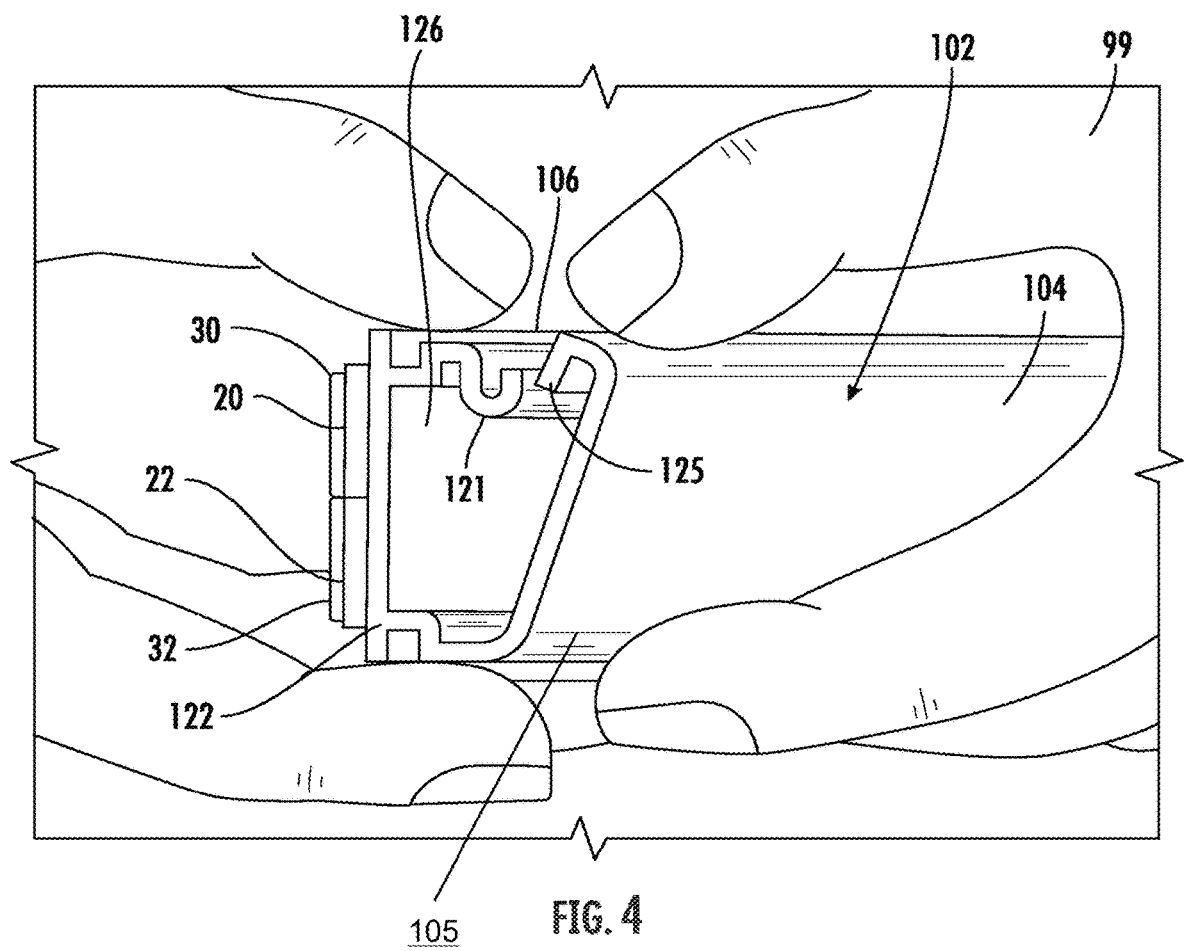
FIG. 4 is a perspective view of a cord cover used in the mounting a wire management system.

In an alternate embodiment, cord cover 102 shown in FIG. 4 can be used. Cord cover 102 includes side wall 106 is coupled or integral to front wall 104 and rear wall 122. A flange including lip 121 can be formed in side wall 106. Lip 125 of front wall 104 can engage lip 121 of side wall 106 to close cord cover 102. Side wall 106 of cord cover 102 can be pushed by user 99 to release lip 121 of side wall 106 from lip 125 of front lid 104 to release side wall 106 from front wall 104. First adhesive portion 20 and second adhesive portion 22 can be adhered to rear wall 122. Cavity 126 is formed between front lid 104, side wall 105, side wall 106 and rear wall 122 as shown in FIG. 4. In the closed position, front lid 104 and rear wall 122 can be parallel to one another and perpendicular to side wall 105 and side wall 106. In an open position, lip 125 of front lid 104 is disengaged from lip 121 of side wall 106. Cord cover 102 can be formed of a flexible plastic material to allow lip 125 of front lid 104 to be disengaged from lip 121 of side wall 106 and to allow lip 125 of front lid 104 to be snapped into engagement with lip 121 of side wall 106. For example, front lid 104 and side walls 105 and 106 can be formed of a flexible material, such as flexible plastic or thermoplastic. Cord cover 102 can be formed of one or more materials including plastic, high density and low-density polyethylene, polyvinyl chloride (PVC), acrylonitrile butadiene styrene (ABS) and nylon materials. Cord cover 102 can be formed of a material which is impact resistant and provides a protective barrier to oils, acids, alkalis and grease and are UL 5A compliant. For example, the flexible plastic can be flexible polyvinyl chloride (PVC). Rear wall 122 can be formed of flexible plastic or rigid plastic. For example, rigid plastic can be formed of rigid polyvinyl chloride (PVC). Front lid 104, side walls 105 and 106 can be co-extruded with rear wall 122. The It will be appreciated that system for mounting cord management system 10 can be used on various cord covers such as described in US Patent Publication Application No. US20200343701 which is hereby incorporated by reference into this application.

During use cord or cords to be covered can be received within cavity 11 of cord cover 12. The user selects a first color of first adhesive release liner 30 for a removable application or a second color of second adhesive release liner 32 for a permanent application. First adhesive release liner 30 as shown in FIG. 1 and/or second adhesive release liner 32 as shown in FIG. 2 is removed and the adhesive material or adhesive strip of the respective first portion 20 or second portion 22 is applied to a surface over which a cord or cable is desired to extend. Alternatively, side wall 106 of cord cover 102 can be pushed by user 99 to release lip 121 of side wall 106 from lip 125 of front lid 104 to release side wall 106 from front wall 104 as shown in FIG. 4. A cord can be inserted into a cavity below front wall 104 between side wall 105 and side wall 106. Front wall 104 can be snap closed before attaching cord cover 102 to retain the cord in cavity the cavity. The user selects a first color of first adhesive release liner 30 for a removable application or a second color of second adhesive release liner 32 for a permanent application. First adhesive release liner 30 and/or second adhesive release liner 32 is removed and the adhesive material or adhesive strip of the respective first portion 20 or second portion 22 is applied to a surface over which a cord or cable is desired to extend.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

The invention claimed is:

1. A system for mounting a wire management system comprising:
    a cord cover having a front lid, first side wall, second side wall and rear wall, the first side wall and the second side wall extending from the rear wall;
    the front lid having one end coupled or integral with the first side wall;
    a cavity formed between the first side wall, the second side wall and the rear wall; the front lid removably engaging the second side wall;
    a first mounting portion including a removable adhesive material attached or coated on first portion of an outer surface of the rear wall of the cord cover and a first adhesive liner is a first color, the first adhesive liner is removably attached to a second side of the removable adhesive material; and
    a second mounting portion including a permanent adhesive material attached or coated on a second portion of the outer surface of the rear wall of the cord cover and a second adhesive liner is a second color, the second adhesive liner is removably attached to a second side of the permanent adhesive material, wherein the first mounting portion is side by side to the second mounting portion, the first mounting portion is configured for removable adhesion to a surface to which the cord cover is adhered and the second mounting portion is configured for permanent adhesion to the surface to which the cover is adhered and wherein the first color of the first adhesive liner removably attached to the removable adhesive material is different than the second color of the second adhesive liner removably attached to the permanent adhesive material.

2. The system of claim 1 wherein the removable adhesive material is a pressure sensitive adhesive.

3. The system of claim 1 wherein the removable adhesive material is a removable adhesion foam tape.

4. The system of claim 1 wherein the permanent adhesive material is a permanent adhesion foam tape.

5. The system of claim 1 wherein the cord cover is configured for receiving one or more cords by flexing the second side wall to release the front lid to insert the cord into the cavity.

6. The system of claim 1 wherein the front lid includes a first flange at an outer end and the second side wall includes a second flange at an outer end.

7. The system of claim 6 wherein the first flange includes a first lip and the second flange includes a second lip, the first lip engaging the second lip for engaging the front lid to the second side wall to close the cord cover.

8. The system of claim 6 wherein the front lip and the second side wall are formed of a flexible material.

9. The system of claim 8 wherein the flexible material is formed of flexible polyvinyl chloride (PVC) or urethane.

10. The system of claim 1 wherein the rear wall is formed of a rigid or semi-rigid material.

11. The system of claim 1 wherein the front lip, side walls and rear wall are co-extruded.

12. The system of claim 1 wherein the cord cover is formed of a material selected from plastic, high density and low-density polyethylene, polyvinyl chloride (PVC), acrylonitrile butadiene styrene (ABS) or nylon.

13. A method for mounting a wire management system comprising: providing a cord cover having a front lid, first side wall, second side wall and rear wall, the first side wall and the second side wall extending from the rear wall; the front lid having one end coupled or integral with the first side wall; a cavity formed between the first side wall, the second side wall and the rear wall; the front lid removably engaging the second side wall; a first mounting portion including a removable adhesive material attached or coated on first portion of an outer surface of the rear wall of the cord cover and a first adhesive liner is a first color, the first adhesive liner is removably attached to a second side of the removable adhesive material; and a second mounting portion including a permanent adhesive material attached or coated on a second portion of the outer surface of the rear wall of the cord cover and a second adhesive liner is a second color, the second adhesive liner is removably attached to a second side of the permanent adhesive material, the first color of the first adhesive liner removably attached to the removable adhesive material is different than the second color of the second adhesive liner removably attached to the permanent adhesive material, the first mounting portion is side by side to the second mounting portion, selecting first color of first adhesive release liner for a removable application or a second color of second adhesive release liner for a permanent application, removing at least a portion of the first adhesive liner of the first color for a removable application and/or at least a portion of the second adhesive liner of the second color for a permanent application, wherein the first mounting portion is configured for removable adhesion to a surface to which the cord cover is adhered and the second mounting portion is configured for permanent adhesion to the surface to which the cover is adhered.

14. The method of claim 13 wherein either the at least a portion of the first release liner and the at least a portion of the second release liner is removed.

15. The method of claim 13 wherein both the at least a portion of the first release liner and the at least a portion of the second release liner is removed.

16. The method of claim 13 wherein the removable adhesive material is a pressure sensitive adhesive or a removable adhesion foam tape.

17. The method of claim 13 wherein the permanent adhesive material is a permanent adhesion foam tape.

18. The method of claim 13 wherein the cord cover is configured for receiving one or more cords by flexing the second side wall to release the front lid to insert the cord into the cavity.

* * * * *